United States Patent [19]

Anderson

[11] 4,037,029
[45] July 19, 1977

[54] PHOTOELECTROGENERATIVE CELL

[76] Inventor: John Harland Anderson, 12920 Nicollet Ave., Burnsville, Minn. 55337

[21] Appl. No.: 596,352

[22] Filed: July 16, 1975

[51] Int. Cl.² .................... H01M 6/30; H01M 6/36
[52] U.S. Cl. ................................ 429/111; 136/89 C
[58] Field of Search ...................... 136/89; 429/111

[56] References Cited

U.S. PATENT DOCUMENTS

| 2,986,591 | 5/1961 | Swanson et al. | 136/89 |
| 2,987,686 | 6/1961 | McQuistan | 338/18 |
| 2,989,575 | 6/1961 | Wallace | 136/89 |
| 2,993,945 | 7/1961 | Huth | 136/89 |
| 2,999,240 | 9/1961 | Nicoll | 136/89 |
| 3,031,520 | 4/1962 | Clampitt et al. | 136/89 |
| 3,879,228 | 4/1975 | Theodorou et al. | 136/89 X |
| 3,989,542 | 11/1976 | Clark | 136/89 |
| Re.19,218 | 6/1934 | Ruben | 136/89 |

OTHER PUBLICATIONS

M. Eisenberg et al., "Photo-Electrochimical Cells", Electrochimica Acta, vol. 5, pp. 1-12, (1961).

R. Gomer, "Photogalvanic Cells", Electrochimica Acta, vol. 20, pp. 13-20, Jan./Feb. 1975.

Primary Examiner—Howard S. Williams
Assistant Examiner—Aaron Weisstuch
Attorney, Agent, or Firm—Orrin M. Haugen

[57] ABSTRACT

Photoelectrogenerative cell means comprising, in combination, cell means including an anolyte cell and a catholyte cell, with means being provided for the transmission of solar radiation into the anolyte cell. The anolyte cell includes an electroconductor solution, along with a photoelectrogenerative compound in admixture therewith, the photoelectrogenerative material being dispersed or dissolved in the electroconductive solution. The catholyte cell comprises an electroconductor in solution, and an electrolytically permeable cell isolation means separates the anolyte cell from the catholyte cell. Electrically conductive electrodes are immersed in each of the respective anode compartments and cathode compartments, and are arranged in electrical contact with the respective anolytes and catholytes. This photoelectrogenerative cell recovers energy produced by photoelectrochemical reactions when placed in a cell configuration.

12 Claims, 4 Drawing Figures

PHOTOELECTROGENERATIVE CELL

BACKGROUND OF THE INVENTION

The present invention relates generally to a photoelectrogenerative cell, and more specifically to a photoelectrogenerative cell which is sensitive to solar radiation, and capable of generating usable electrical energy through exposure to solar radiation. The cell of the present invention may function by reactions involving photovoltaic phenomena, photochemical phenomena, or enzyme reaction phenomena. In addition to functioning as an energy generator, the photoelectrogenerative cell means of the present invention may, in certain instances, be employed as an energy storage device.

DEFINITION OF TERMS

In order to clarify the subject matter of the present invention, the following definitions of terms are deemed appropriate:

Photovoltaic compounds: As used in accepted Physical-Chemical Conventions to describe semiconductor compounds which produce a potential or electromotive force when exposed to light. Includes such materials as cadmium sulfide, certain germanium compounds, intermetallic compounds, lead sulfide, certain titanium compounds such as titanium dioxide, silicon, selenium, and the like.

Photoelectrogenerative: Any material which exhibits an electromotive force when exposed to light, and set in an appropriate cell configuration. Includes solutions, suspensions, or mixtures of photovoltaics, photochemicals, and photochemically active enzymes. The act of photoelectric phenomenon.

Electroconductors: As used in a cell it may be composed of a solute and solvent, fused salts, ionized gases, or the like, which permit mass transfer, or transport of charged particles; includes liquid systems which permit electron flow at least at solution-electrode interfaces. Most commonly, it is a combination of water with a dissolved electrolyte.

Gaseous electroconductors: Any gas which ionizes, and thereby transports electricity (see electroconductors).

Non-aqueous electrolytes: Any solution of electrolytes in solvents other than water, and in which electrolytic dissociation takes place. Examples include fused salts, organic solutions of electrolytes, such as organometallics, gases, and the like.

Photosensitive: A compound, material, solution or gas, which is altered or enhances alteration of a substance by exposure to light so as to result in a changed energy state.

Photochemical: As used in Physical-Chemical Conventions, denotes the susceptability to chemical alteration of an element, compound, suspension, or mixtures thereof by light.

Anolyte: As used in Electrochemical Convention, describes the electroconductive solution which is exposed to the anode of a cell.

Cell coupling: An arrangement or configuration which permits the flow of electrons or ions.

Electrically permeable: A property of material that permits the flow of electricity. Generally herein pertains to a semi-porous barrier, diaphragm, or ion exchange membrane.

Catholyte: As used in Electrochemical Convention, describes the electroconductive solution which is exposed to the cathode of a cell.

Semi-dry cell: An electrochemical cell in which the electrolyte, or electroconductor solutions are in admixture with viscosity increasing materials such as a paste or gel.

Storage cell: An electrochemical cell in which the charge is at least partly retained for a period of time, and which is capable of providing electrical power for future discharge.

Biased electrode: Electrodes of dissimilar oxidation reduction potentials which alter the orientation and migration of charged particles.

Opaque: Substantially blocks the passage of light.

Flat plate collector: Absorbs direct and diffuse radiation, and may be coupled with reflectors, thereby utilizing diffuse and direct radiation as appropriate to the configuration.

Concentrating collectors: Dependent principally on concentrated radiation being presented to the absorbing body. Concentrating devices include focusing mirrors, and lenses, and normally utilize direct radiation.

Electrogenerative cells are well known in the art, and frequently employ the utilization of dissimilar metals for the generation of a flow of electrical energy. In most electrogenerative cells, at least one of the electrodes becomes sacrificial to the system and is normally consumed during the generation of electrical energy. Both primary and secondary cells are in wide use, and similar basic principles apply to each system.

In order to provide additional sources of electrical energy, various techniques have been employed for the utilization of incident solar radiation for power generation. Such systems frequently employ semiconductor devices so as to provide a solar battery system for power generation.

Photocells are frequently employed for the purposes of generating an electrical signal while being employed as a condition responsive device or the like. The presence or absence of incident light energy is detected by the photocell as generating a galvanic signal which is responsive to the immediate condition being sensed. As such, the photocell devices are primarily photovoltaic, these materials being, for the most part, semiconductor materials and are well known in the art. See, for example, the U.S. Pat. No. Re. 19,218, to Ruben which discloses a light sensitive device including a photovoltaic anode or electrode, a cathode, and an electrolyte in communication with both the anode and cathode.

SUMMARY OF THE INVENTION

In connection with the present invention, a photovoltaic compound, or other photoelectrogenerative material, is provided in a photoelectrogenerative cell, wherein the photosensitive electrogenerative material is utilized to establish a flow of electrical energy in response to an input of solar energy. The cell means functions, therefore, as a source of electrical power, with the input being solar radiation, the output being electrical power, and with the photoelectrogenerative cell operating as a converter between the solar input and the electrical power output. The utilization of the photoelectrogenerative cell means of the present invention may be either in series, parallel, or combination series-parallel relationship in order to achieve the appropriate match of electrical power to the immediate need or requirement. As will be appreciated, the output of the photoelectrogenerative cell means of the present invention is a direct current output which may be, when desired, applied to a suitable inverter to achieve alternating current power.

The concept of the present invention utilizes the phenomena of photosensitive compounds in an electrogenerative cell wherein the phenomena may be converted to a useful purpose of power generation. As such, electrolytic effects are not necessarily relied upon for the establishment of a flow of electrical energy, with the power requirements being made available primarily through the photovoltaic phenomena of the photosensitive compounds employed in the electrogenerative cells.

Briefly, in accordance with the present invention, a photoelectrogenerative cell means is provided which contains an anode compartment and a cathode compartment separated by means of a diaphragm, or the like, which permits electrical or internal cell coupling, while physically isolating the respective anolyte and catholyte solutions. A photovoltaic compound, for example, is placed in admixture with the anolyte, and is utilized within the anode compartment. In addition, an electrolyte is present in the aqueous solutions forming the anolyte and catholyte respectively, with the electrolyte present preferably being generically similar in conduction characteristics in each of the respective compartments forming the cell means of the present invention. The anolyte and catholyte are composed so as to provide electrochemical balance to the cell, thus permitting anodic reaction to the sun, and a counter-balancing cathodic reaction. In order to achieve access to solar radiation, the anolyte cell is arranged to be exposed in solar viewing relationship, with the cathode cell or compartment being in electrical correspondence with the anolyte, and isolated from the incident solar radiation if a photosensitive material is also present in the catholyte.

Therefore, it is a primary object of the present invention to provide a photoelectrogenerative cell means which includes an anode compartment and a cathode compartment, and with a photovoltaic, or a photoelectrogenerative material being disposed in admixture in an electroconductive solution forming the anolyte retained within the anode compartment, and with means being provided to expose the anode compartment to incident solar radiation.

It is a further object of the present invention to provide an improved photoelectrogenerative cell means which is capable of converting incident solar radiation to a substantially continuous flow of electrical energy.

It is yet a further object of the present invention to provide an improved electrogenerative cell in the form of a photoelectrogenerative cell employing solar radiation as an input, the cell functioning as a converter of the solar radiation to a flow of usable electrical energy.

It is yet a further object of the present invention to provide an improved photoelectrogenerative cell means which comprises spaced anode and cathode compartments containing aqueous solutions or other medium forming an anolyte and a catholyte respectively, with the anolyte containing a photoelectrogenerative material in admixture therewith, and with electrode means being provided to obtain an external flow of electrical energy from said cell.

It is yet a further object of the present invention to provide an improved photoelectrogenerative cell which functions through photo-phenomena including photovoltaic and photoelectrical phenomena, the photoelectrical phenomena including inorganic reactions, organic reactions, as well as enzyme reactions.

Other and further objects of the present invention will become apparent to those skilled in the art upon a study of the following specification, appended claims, and accompanying drawings.

DESCRIPTION OF THE PREFERRED EMBODIMENT

As will be appreciated, the photoelectrogenerative cell means of the present invention requires an anode compartment, a cathode compartment, and means for isolating the individual compartments forming the cell, one from another. The isolation means, as is traditional, provides electrical coupling between the individual compartments forming the cell. With attention being directed to FIG. 1 of the drawings, it will be observed that the photoelectrogenerative cell means generally designated 10 includes a composite cell retainer 11 along with a divider or barrier member 12 separating the cell 11 into a pair of adjacent compartments including the anode compartment 13 and the cathode compartment 14. It is desired, of course, that the member 12 be one which isolates the individual cells while continuing to provide electrical coupling therebetween. Suitable membranes include, for example, membranes fabricated from polypropylene on the like, such as that certain unwoven polypropylene material sold under the Code Name "Kendall 1461" by The Kendall Company of Chicago, Illinois. A wide variety of suitable barrier materials are, of course, commercially available and are well known in the art, and includes ion exchange membranes, as well as two immiscible conductive fluids or mediums.

Figure 1:
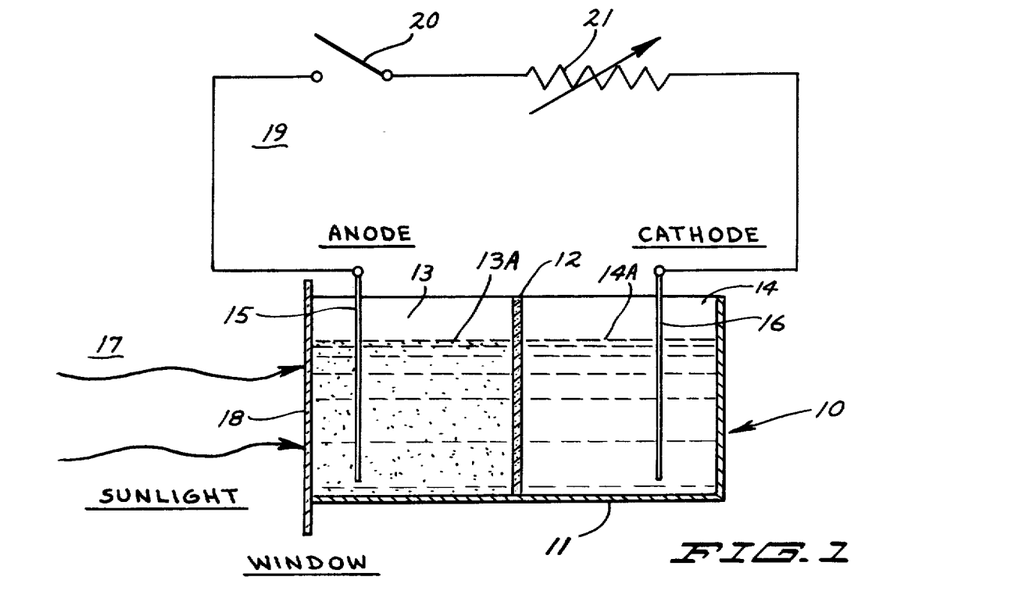
FIG. 1 is a combination vertical sectional view and schematic diagram, and illustrating, in section, the photoelectrogenerative cell means of the present invention including an anode compartment and a cathode compartment together with anode an cathode electrodes, the electrodes being coupled to an external electrical circuit, and with the cell wall materials being inert and non-conductive so as to prevent electrical shorting.

The anode compartment 13 and cathode compartment 14 each contain an aqueous solution in the form of an anolyte 13A and a catholyte 14A. As has been indicated, the anolyte and catholyte are preferably generically similar in conduction characteristics, containing ideally the same electrolyte at the same concentration as will be more specifically set forth hereinbelow.

Electrodes in the form of anode 15 and cathode 16 are in contact with anolyte and catholyte respectively, and in this connection are similar to those anodes and cathodes conventionally utilized in electrochemical systems. In order to achieve power output without regard to the utilization of sacrificial materials, it may be, in certain instances, desirable to employ anodes and cathodes which are fabricated from similar materials, including electrical conductors such as metals, metal oxides, impregnated plastics, carbon or the like.

Solar radiation in the form of sunlight such as is illustrated at 17, is arranged for passage through solar viewing window 18. In this connection, solar viewing window 18 is preferably fabricated from a material which is highly transmissive to solar radiation, particularly to solar radiation within the range of from between about 2000 A and 10,000 A. One such material is calcium fluoride, $CaF_2$, it being understood, of course, that other solar transmissive materials may be employed as well. In certain cell constructions, a photo-transmissive membrane such as a membrane fabricated from polyvinylfluoride, polyethylene, glass or the like may be employed.

The external circuitry is illustrated generally at 19, and provides an external circuit coupled serially between the anode and cathode electrodes, such as switch means 20 along with load 21 in the schematic form of a variable resistor.

In a typical example, the following cell may be utilized:

EXAMPLE 1

A battery jar was employed in the form of an open top container with dimensions 2½ inches × 4½ inches × 8 inches. To this glass container, an unwoven polypropylene diaphragm material was secured so as to provide two isolated compartments forming an anode compartment and a cathode compartment, the diaphragm material being Kendall 1461 unwoven polypropylene. An agitator was provided for the cell in the form of a Corning Hot Plate Agitator PC-351. Copper electrodes were provided in each of the cells and were retained in place by phenolic strip holders.

The electrolyte empolyed in each of the cells was prepared as follows: 450 ml. of solution was utilized, with 150 ml. being retained in the cathode compartment, balance 300 ml. in the anode compartment. The electrolytes employed were sodium bicarbonate and sodium sulfate, with the solution containing 31.05 grams sodium bicarbonate (approximately 0.3 molar), and 21.39 grams of sodium sulfate (approximately 0.3 molar). To the material disposed in the anode compartment (the anolyte), there was added 43.4 grams of cadmium sulfide (approximately 1 gram molecular weight per liter). The pH of the solution was approximately 8. In general, good electrochemical practice is followed in the preparation of the cell.

The operation of the solar collector as a cell which produces current is predicated upon the ability of the cell to keep the anodic or electron producing reagents from direct contact with the cathodic or electron accepting reagents in the presence of the activating agent which, in this case, is solar radiation. There are several ways of achieving this:

1. Physical separation of the two reagents in compartments separated by an appropriate membrane. The anodic compartment can then be irradiated while keeping the cathodic reagents in the dark.

2. Biasing the cell with a potential. In the presence of light, the electrons will preferentially travel to one electrode and protons to the other, and the cell may be discharged externally across a load to perform work. Equilibrium may be restored in a reversible reaction in the dark.

3. Micro-encapsulation of the reactive species. This is a variation and combination of (1) and (2). Many species or reagents are air or oxygen sensitive. By micro-encapsulating the species, not only is their stability enhanced, but competing and contaminant molecules are kept out. Again, a bias voltage permits current to flow in the presence of light.

The cell was arranged so that incident solar radiation was passed into the anode compartment, and with the solution being held at approximately room temperature, approximately 0.3 volts of output with one-half mA of power were achieved.

Agitation is employed in order to maintain the cadmium sulfide in suspension and to aid electron discharge. In lieu of agitation, it is possible in certain cell structures to employ a suspending agent which assists in maintaining uniformity of dispersion of the insoluble cadmium sulfide.

Cadmium sulfide is deemed insoluble in the alkaline solution employed, however, photoelectrogenerative reactions are occurring in the cell. Furthermore, the cadmium sulfide concentration in the anolyte appears to be in excess of what concentration may be required for obtaining opacity to sunlight in a solution thickness of approximately ¼ inches.

EXAMPLE 2

The solutions employed in connection with Example 1 were removed from the cell, and permitted to stand for a period of 2 hours. The solutions were then returned to the cell and the results achieved by way of cell output were substantially the same as those obtained in connection with Example 1.

The surfaces of the electrodes were polished in order to enhance the conductivity between the cell components and the electrodes.

EXAMPLE 3

The equipment and solutions employed in Example 2 were permitted to stand for 4 hours out of contact with sunlight. The electrodes were immersed in the solution during this entire period of time.

Following re-exposure to the sunlight, and following a period of shorted output, the cell was permitted to stand for approximately 30 minutes whereupon the shorted output was interrupted for a reading, and the cell thereupon indicated an output of 0.075 volts at 0.12 mA. Upon agitation of the solution, and 20 minutes thereafter, the output was 0.12 volts at 0.2 mA.

This indicates a storage capability for the cell under dark conditions.

EXAMPLE 4

The photosensitivity of the concept was illustrated in this example. The solutions were prepared as in Example 1, with the time and characteristics being indicated in the Table hereinbelow:

TABLE I

| Elapsed Time (Minutes) | Volts | Milliamperes (mA) | Remarks |
| --- | --- | --- | --- |
| 0 | 0.02 | 0 | 27.5° C., kept hooded. |

TABLE I-continued

| Elapsed Time (Minutes) | Volts | Milli-amperes (mA) | Remarks |
|---|---|---|---|
| 10 | 0.02 | 0 | Exposed to sunlight |
| 15 | 0.145 | 0.24 | Approximately 50% sunlight. Voltage rises and falls between sun and shade: 0.135 volts to 0.155 volts. |
| 23 | 0.140 to 0.16 | | Sun and shade dependent. |
| 23 | 0.01 | | Shorted and shaded. |
| 30 | 0.125 | | Interrupted short to read. |
| 32 | 0.01 | | Shorted. |
| 47 | 0.11 | | Interrupted short to read. |
| 49 | 0.13 | | Opened to sun, 27.5° C., voltage starts to climb immediately. |
| 53 | 0.16 | | |
| 53¼ | 0.18 | | Severe stirring. |
| 58 | 0.16 Added heat | | 27.5° C. Shaded. |
| 60 | 0.13 | | Shaded. |
| 70 | 0.15 | | Shaded, 29.5° C. |
| 80 | 0.19 | | Shaded, 32° C. |
| 85 | 0.215 Exposed to sunlight | | Shaded, 39.5° C. |
| 93 | 0.26 | | Approximately 50% sunlight. |

The above example indicates the photosensitive characteristics of the cell. Furthermore, the increase in temperature improves the cell potential, and furthermore, since the system discharge rate is slow, storage capability is indicated. Recharging of the cell upon exposure to sunlight is rapid.

The addition of a sufficient quantity of carbon particles can poison the anolyte and cause a rapid drop in both voltage and current output. The addition of the conductive carbon appears to impede the electrogenerative reaction to the same extent as if it were being shaded or hooded. If properly used, the heat build-up due to the presence of the carbon black serving as a heat absorbant in the cell may provide some advantages in internal cell heating. Such a use would require the use of less carbon than that which totally obscures the photovoltaic from sunlight. To a degree, a photoelectrogenerative material in mixture with a heat absorbant material could be utilized to enhance the heat capacity of the fluid medium and increasing the efficiency of the collector in the solar heating system. Such effects can be further enhanced by the addition of other non-electrogenerative materials in the transfer fluid, but unless care is taken, the addition of inert materials can have a deleterious effect on the photoelectrogenerative cell, particularly in the anolyte.

One may prefer to employ a configuration wherein the catholyte, containing such non-electrogenerative materials as heat absorbants, is at some point exposed to the sun for cell heating purposes.

EXAMPLE 5

The cell utilized in connection with Example 1 was utilized in this example, and with the same electrolyte employed as in Example 1. During the course of this operation, the effect of the addition of sodium bicarbonate was determined, and is set forth in Table II hereinbelow:

TABLE II

| Elapsed Time (Minutes) | Volts | Milli-amperes (mA) | Remarks |
|---|---|---|---|
| 0 | 0.155 | 0.26 mA | Start – good sunlight, 23.5° C. |
| 5 | 0.155 Added NaHCO₃ | 0.26 mA | |
| 5¼ | 0.155 | 0.26 mA | 10 g. NaHCO₃ added to anolyte. |
| 10 | 0.20 | 0.33 mA | 5 g. NaHCO₃ added to catholyte. |
| 15 | 0.20 | 0.33 mA | Cadmium sulfide settles and voltage is still up. |
| 16 | | | Shaded and shorted. |
| 65 | 0.10 | 0.17 mA | Short removed. Exposed to sunlight. |
| 69 | 0.18 | 0.3 mA | Recharging. |
| 72 | 0.195 | 0.32 mA | Recharging. |
| 74 | 0.20 | 0.33 mA | 23.5° C. |
| 75 | 0.20 | 0.33 mA | End. |

EXAMPLE 6

The cell structure employed in connection with Example 1 was employed in this example, with the electrolyte being as follows:
11.0 grams cadmium sulfide
The sodium sulfate and sodium bicarbonate utilized in Example 1 were utilized in this example together with 15 grams Kelgin, a suspension agent.

The reduced concentration of cadmium sulfide in the cell did not appear to greatly reduce the output. The suspension agent appeared to eliminate the need for continuous agitation, and was capable of providing a semi-dry cell. It is also anticipated that stainless steel wool, screens, or an interleavened gridwork could provide examples of electrode geometry which may be used advantageously in cells. Modified forms of electrodes may also be employed such as impregnated plastics and the like in order to enhance the physical contact between components.

The output of the cell structure was as follows:

TABLE III

| Elapsed Time (Minutes) | Volts | Milliamperes (mA) | Remarks |
|---|---|---|---|
| 0 | 0.14 | 0.23 mA | Start – 28° C. Full sun. |
| 20 | 0.115 | 0.19 mA | Shaded conditions. |
| 30 | 0.11 | 0.18 mA | Shaded conditions. |
| 49–50 | 0.11 to 0.14 | 0.18 mA to 0.23 mA | Short interval of full sun between shaded conditions. |

In the above cell, stainless steel electrodes were substituted for the copper electrodes, with the size remaining the same. In a zone receiving only indirect sunlight, the voltage increased from approximately 0.095 volts to approximately 0.17 volts over a period of approximately 11 minutes.

GENERAL DISCUSSION, EXAMPLES 1–6

With the improvement in cell geometry and electrode materials available, as set forth in Example 6, output currents of 2 to 10 mA are readily obtainable along with voltage outputs of approximately 0.2 to 0.4 volts. A scale-up accordingly is available wherein outputs of approximately 280 watts per hour at 2 mA are available for 1000 square feet of cell area, with outputs of up to 1400 watts per hour at 10 mA for cells equipped to 1000 square feet.

Figure 2:
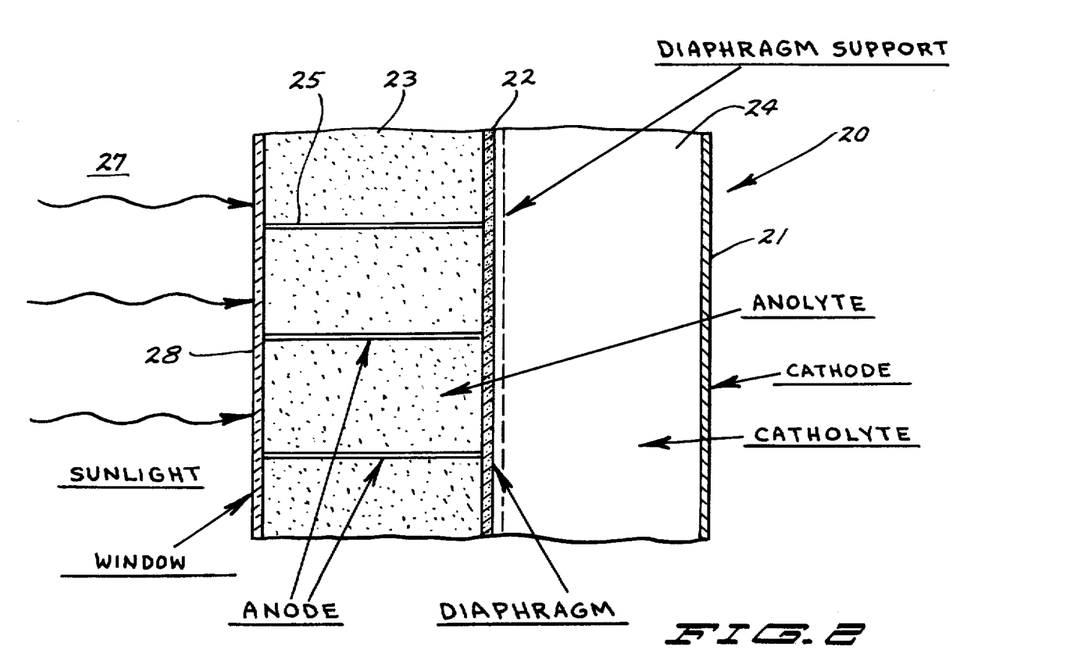
FIG. 2 is a sectional view of a form of a photoelectrogenerative cell means which may be utilized in connection with the concept of the present invention, and illustrating a fragmentary portion of a cell showing both anode and cathode compartments together with a compartment isolating member.

EMBODIMENT OF FIG. 2

In the embodiment illustrated in FIG. 2, the cell 20 is retained within spaced compartments including the cathode wall 21, the diaphragm zone 22 which separates the anode compartment 23 from the cathode compartment 24. The anode is illustrated as a series of spaced plates 25—25, with the anolyte being in mutual contact with each of these electrodes. The cell wall 28 is designed to transmit solar radiation such as is indicated by the rays 27 in order to achieve the cell operation similar to that illustrated in FIG. 1.

Figure 3:
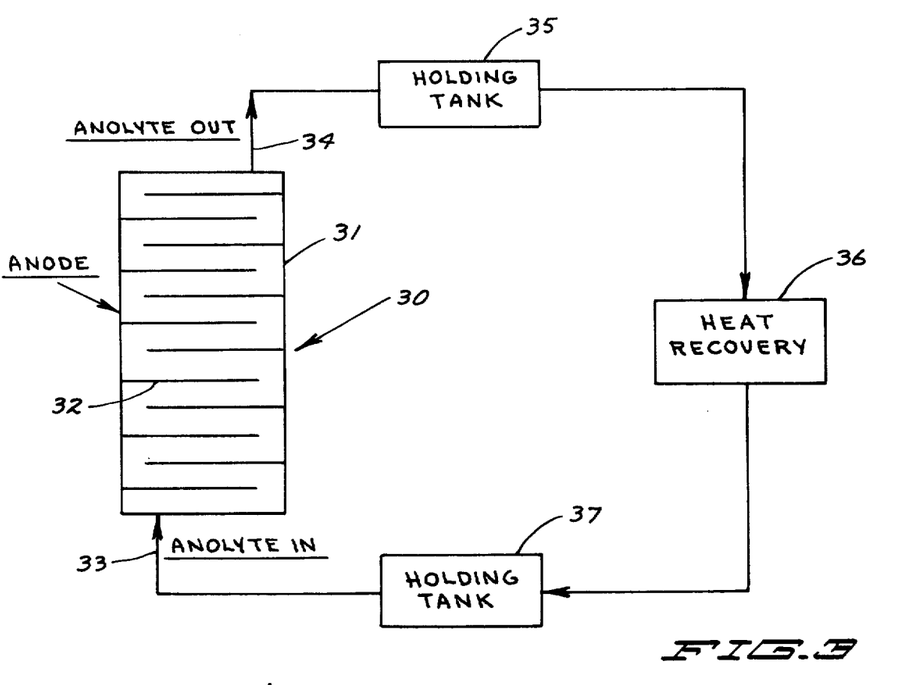
FIG. 3 is a schematic diagram of a photoelectrogenerative system utilizing the concept of the present invention, and illustrating an anode compartment which employs a circulating means for handling the anolyte.

EMBODIMENT OF FIG. 3

The system illustrated in FIG. 3 includes a cell 30 having interleaved anodes 31 and 32, as illustrated, with the cell receiving a moving charge of anolyte solution at 33, while discharging this solution at 34. A holding tank 35 may be used to retain surges of material pending its passage through the heat recovery chamber 36. Holding tank 37 may be utilized, for example, for other purposes such as for make-up and drain solutions, solution treatment, or the like, such as a use pending re-introduction of the anolyte into cell 30.

Figure 4:
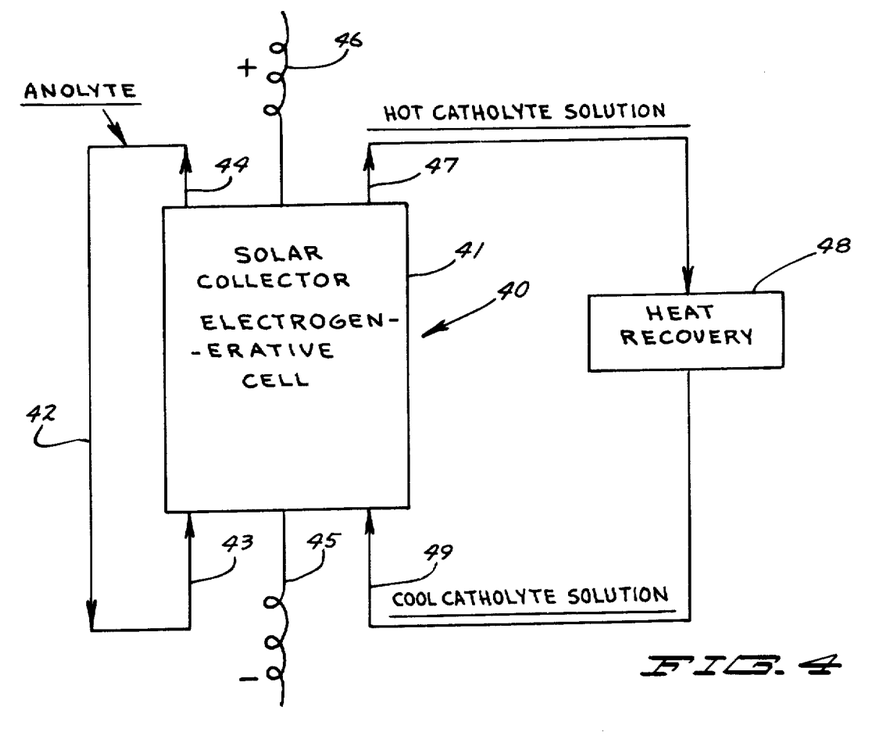
FIG. 4 is a schematic diagram of another form of photoelectrogenerative cell means employing the concept of the present invention, and wherein means are provided to utilize solar energy to provide thermal energy in addition to electrical energy, depicting a single solar collector.

EMBODIMENT OF FIG. 4

The system illustrated in this configuration is essentially the same as that previously described, with some additional refinements for utilization or dissipation of thermal energy. The cell 40 includes a chamber having walls 41 and an anolyte pumping system 42, which introduces anolyte into the cell at 43, while removing it from the cell at 44. Electrical energy is extracted from electrodes 45 and 46, where indicated, while the catholyte serves as a heat exchange fluid to control temperature conditions within the cell, the heat exchange system including outlet 47, along with heat recovery member 48, with conduit means being provided to re-introduce the cooled solution to the cell as at 49.

PHOTOCHEMICAL SOLUTIONS

An inorganic photochemical solution may also be prepared utilizing cuprous chloride and sodium chloride with a typical solution being formulated as follows:

2.0 molar cupric chloride is dissolved in a 75% NaCl saturated solution with 1 ml. per liter of concentrated HCl added. An excess of the theoretical reactant copper is added to the solution, and the solution is handled under an oil film floated on the solution surface as an air barrier. The copper is dissolved in the solution with an ultrasonic agitator so as to result in a cuprous chloride/sodium chloride solution. The absence of color indicates an absence of cupric chloride, and the resulting solution may be used as the electrolyte.

Cuprous chloride is photochemically active and it is believed to react as follows:

(1) $2 CuCl + light \rightarrow Cu^* + CuCl_2$

The same type of reaction is believed to apply to certain other photochemically sensitive substances.

In addition to cuprous chloride, other photochemically reactive materials such as silver chloride, sulfur trioxide, chlorine or the like may be considered. The reactions will be, of course, similar to those set forth in reaction (1) hereinabove.

In a polyvalent system, wherein a photosensitive substance exists in a variety of oxidation states, as is in the case of cuprous and cupric copper, or in complex formatives, a certain solution may be utilized simultaneously as the catholyte and as the anolyte. In operation, one of the compartments, the anode compartment, is exposed to solar radiation, while the cathode compartment is shielded. In this operation, therefore, the catholyte may be reduced while the anolyte is undergoing photochemical oxidation.

In the polyvalent system mentioned hereinabove, the reaction occurs as follows:

Anode reaction:

(2) $CuCl + light + [Cl^-] \rightarrow CuCl_2 + 1 e^-$

Cathode reaction:

(3) $CuCl (dark) + 1 e^- \rightarrow Cu^* + [Cl^-]$

In each instance, the membrane is electrically permeable to the chloride ion, such as an ion exchange, or ion transport membrane.

EXAMPLE 7

Using the diaphragm cell described in Example 1, 300 ml. of the CuCl/NaCl solution described in Photochemical Solutions hereinabove was added to the anode compartment, and 150 ml. of the same CuCl/NaCl solution was added to the cathode compartment (see reactions (2) and (3) hereinabove). The electrodes were copper, and it is understood that other electrodes such as carbon electrodes may be utilized. The catholyte was protected from exposure to solar radiation by covering the cathode compartment exterior walls with aluminum foil, and the disparity in anolyte/catholyte volumes was tolerated in order to maximize the light exposure of the anolyte. In order to protect the cuprous solutions from air oxidation, an oil film was floated on the surface of the anolyte and catholyte.

The results obtained were as follows:

TABLE IV

| Elapsed Time | Volts | Microamperes | Remarks |
|---|---|---|---|
| Start | 0.00 | 0.00 | |
| 15 min. | slight deflection | slight deflection | Sun as possible. |
| 75 min. | 0.02 | 0.75 | Sun as possible. |
| 24 hrs. | 0.02 | 2.5 | Sun as possible. |
| 48 hrs. | 0.25 | 3.8 | Sun as possible. |
| 72 hrs. | 0.25 | 4.0 | Sun as possible. |

The system described utilizes photosensitive cuprous chloride to produce electrical power when exposed to solar radiation in a diaphragm cell. Inert electrodes should be used whenever possible to preserve the integrity of the reactant solutions.

In another variation, an electrochemical cell may be set up with the photo-reactant as the anolyte, and with a catholyte consisting of a simple electrolyte, or a material classified as a reducing agent.

EXAMPLE 8

A cell was prepared as previously described utilizing cuprous chloride content of 100 grams per liter, with 300 ml. being utilized for the anolyte. The catholyte was 150 ml. of 75% saturated sodium chloride solution. An air barrier of oil was floated on the top of the CuCl- /NaCl anolyte, with no air barrier being placed on the catholyte solution.

The utilization of an electrochemical cell with a photo-reactant for the anolyte and catholyte containing a reducing agent can be exemplified by the following reaction:

Anode reaction:

(4) $CuCl + light + [Cl^-] \rightarrow CuCl_2 + 1\ e^-$

Cathode reaction:

(5) $\frac{1}{2} O_2 + 2\ e^- \rightarrow [O^{-2}]$

It is believed, from information obtained, that this is the nature of the cathode reaction occurring. In the presence of copper chlorides, this system is rendered more complex by the, at least temporarily, existence of a variety or multiplicity of copper-chloride complexes (see reactions (6) through (10)).

The cell of Example 8 was placed in direct exposure to solar radiation, with the results being as follows:

TABLE V

| Elapsed Time | Volts | Microamperes | |
|---|---|---|---|
| Start | 0.09 | 17 | direct short |
| 3 min. | | 19 | direct short |
| | | 19 | 10 ohms |
| | | 11 | 400 ohms |
| | | 0 | 1 megohm |
| 10 min. | 0.115 | 22 | |
| 120 min. | 0.14 | 25 | |
| | overnight direct short (10 hours) | | |
| overnight | 0.11 | 20 | |
| | 48 hrs. open to light as possible | | |
| | 0.15 | 25 | |
| | 0.12 | 15.5 | 400 ohms |
| | covered 24 hours (no light) | | |
| | 0.15 | 24 | capable of storage |
| | 0.14 | 16 | 400 ohms |
| | to sunlight as possible for 24 hours | | |
| | 0.205 | 28 | |
| | 0.165 | 19.5 | 400 ohms |

This system provides a natural battery with the cell obtaining a greater output while in solar exposed condition. The variety of complexes of copper chlorides, as well as their various charges, tend to render the cell reactions complex.

Hine & Yamakawa have reported on the possible oxidation/reduction reactions which occur for copper chloride complexes in Electrochimica Acta, Vol. 13, p. 2119, 1968, with these reactions being as follows:

(6) $CuCl_2^- \rightleftarrows Cu^{+2} + 3\ Cl^-$
(7) $CuCl_4^{-3} \rightleftarrows Cu^+ + 4\ Cl^-$
(8) $CuCl_3^{-2} \rightleftarrows Cu^+ + 3\ Cl^-$ Because of the complexity of the reactions, and since the various reactions may be photochemically activated for charging and discharging the system, the conventionally described photolysis may in fact be occurring, or mixtures of reactions may also be simultaneously occurring as follows:

(9) $CuCl + [Cl^-] + light \rightarrow CuCl_2 + 1\ e^-$
(10) $CuCl + 1\ e^- \rightarrow Cu^* + [Cl^-]$ (see also reactions (2) and (3) hereinabove).

EXAMPLE 9

The equipment utilized for this example includes a conventional food blender along with the electrogenerative cell as described in Example 1 consisting principally of a battery jar, diaphragm separator of polypropylene to form a catholyte and an anolyte retaining chamber, an electrode holder, and two stainless steel anodes and one stainless steel cathode.

The blender was utilized to chop freshly cut green leaves and grass, along with sodium sulfate, sodium bicarbonate, and hydrochloric acid.

Fresh green leaves and grass were "liquified" in the food blender with water being added. The pH of the solution was adjusted to approximately 6 utilizing HCl and back-titrating with $NaHCO_3$. To this mixture, 5.0 grams $Na_2SO_4$ was added to improve the conductivity.

The solids were filtered from a portion of the mixture so as to yield 150 ml. of filtrate solution. The filtrate was heated to boiling so as to inactivate enzymes present. The solution was cooled and water added to restore the volume to 150 ml. This was poured into the cathode compartment of the cell.

The anolyte was prepared utilizing 300 ml. of unfiltered, unboiled portion of the solution, and stirred occasionally. The results were as follows:

TABLE VI

| Elapsed Time | Volts | Microamperes | Remarks |
|---|---|---|---|
| Start | none detectable | none detectable | Put into sunlight. [infinite load (direct short)] |
| 1 hr. 5 min. | 0.035 | 4.5 ∞ | Sediment is working up and down. |
| 7 hrs. 45 min. | 0.04 | 6.5 ∞ | |
| 17 hrs. 45 min. | 0.04 | 7.0 ∞ | Dark - works as storage cell. |
| 24 hrs. 45 min. | 0.055 | 9.5 ∞ | |
| 25 hrs. 55 min. | 0.07 | 14 ∞ | Added 0.5% Kelgin-low viscosity. |
| 48 hrs. 40 min. (day reading) | 0.075 | 12.5 ∞ | |
| 56 hrs. (day reading) | 0.09 | 16.5 ∞ | |
| 5 days | 0.15 | 19 ∞ | |

It was found that the voltage was not appreciably different with increased anode area, while current capability was increased with anode electrode area increases.

The diaphragm cell employing photosynthesis is photoelectrogenerative. It is felt, therefore, that the basic nature of an enzyme reaction is electrochemical and has been demonstrated in the case of chlorophyll and photosynthesis. It was further found that this cell operated as a storage cell for energy storage purposes.

It has herein been found that an enzyme, when exposed to an electromagnetic source, produces an electrochemical result. The electrochemical role for the enzyme functions, including simple or complex reactions, is therefore suggested and believed to exist.

HISTORY OF ENZYME THEORIES

According to existing concepts, enzymes are colloidal organic catalysts produced by living matter. Reactions that normally occur proceed at a relatively slow rate and may, under proper conditions, be accelerated by the addition of an appropriate enzyme.

One theory explaining the functioning of enzymes is entitled the "lock and key theory". This theory suggests the arrangement wherein a substrate, like a lock, has a specific configuration and requires an enzyme with a specific matching configuration, such as the key, to cause it to react. This concept has existed for a substantial period of time.

In 1942, D. D. Van Slyke suggested a kinetic activation theory in combination with the "lock and key theory" described above. In this theory, a molecule of the reactant substrate moves along until it strikes an enzyme at a specific reaction site. If the substrate lock and key are compatible, reaction may occur. The energy for producing the reaction is normally explained as being provided by the kinetic energy of the collision between the enzyme and the molecule.

An additional accepted theory is the Michaelis and Menton theory. According to this theory, enzymes complex with the substrate at a certain stage in the reaction forming an enzyme-substrate complex at the surface. Reaction may occur at the enzyme surface at certain reactive points, or merely leave the enzyme "energized" to react in a certain fashion following separation.

In 1937, Hellerman proposed an additional theory for the reaction of enzymes which involved oxidation and reduction and is explained as follows:

It has also been found that enzymes are specific in their action and reaction, choosing to react only on specific materials, either a single species or genus of a compound, or on a specific family or sub-family of compounds. It has been found that they commonly require specific reactive conditions, including pH level, concommittant dissolved minerals or the like which may serve as "activators", temperature conditions, oxidation/reduction conditions, and the like.

THE PRESENT ENZYME THEORY

It is known that enzymes are composed of a protein apoenzyme, and a prosthetic group to which certain properties may be ascribed. Accordingly, enzymes through their protein structure, are known to carry an electrical charge, thus being available as either electron donors or acceptors. In this connection, the charge on a protein follows the affects of the hydrogen ion concentration on the amine group of the protein molecule as follows:

Therefore, if one considers the enzyme in terms of electrons, as in electrochemistry, the following may be advanced:

Accordingly, an oxidizing enzyme is analogous to an anode and capable of accepting electrons, while a reducing enzyme is analogous to a cathode and donates electrons. When acting as an electron donor, the enzyme could obtain electrons by side reactions with the medium, the substrate, or from its apoenzyme, including light as an energy source. While acting as an acceptor of electrons, the enzyme may discharge its electrons to the medium, or to the substrate, or to its apoenzyme.

Now consider that photosynthesis is a process which builds chains of carbon, which are caused to undergo additions of water, by enzymic reactions with light:

Following this theory, therefore, a reducing enzyme reaction may be enhanced with the addition of an electrical current, and an oxidizing enzyme reaction may be utilized to produce electrical energy. While biological fuel cells are known, it is not believed that direct electrical energy has been used to enhance enzyme reactions.

In order to further develop this theory, supplementary to the photosynthesis experiments, the following test was conducted:

300 ml. of tap water, adjusted to pH 6, was mashed with 30 g. of ground malt at 25° C. under continuous agitation. The temperature was raised on the mash at a uniform rate so as to arrive at 56° C. in 90 minutes. Then heat was increased to get 66° C. in 20 minutes, and iodine tests begun, and temperature rise allowed to continue to 69° C. The temperature was held at 69° C., plus or minus 0.05° C. until negative iodine tests resulted.

Without electricity added, conversion time was 2 hours and 20 minutes.

With electricity, conversion took 2 hours. The 20 minute time differential is considered to be significant.

No temperature difference was noted that could produce an alteration of the thermokinetics, because heating was adjusted to produce the same temperatures. No hydrogen was visibly evolved from the cathode, although because of the opacity of the medium and the agitation, it would probably not be visible. The electrodes appeared as clean at the end of electrolysis as they were at the start.

The mashing vessel was a battery jar. A 0.4 inch carbon rod was used as an anode, with an immersion of 1¼ inches. A 1¼ inch copper sheet was used as a cathode, with an immersion of 2¼ inches. Under such an arrangement, copper is not dissolved in the medium.

An EMF of 7½ to 8½ volt (D.C.) was used, with a current approximating 1 ampere.

As previously discussed, the charge on the protein portion of the enzyme molecule is believed, in the common literature, to be pH related. At a pH over the isoelectric point, the amine groups lose a proton, resulting in a negative charge on the amino groups. At a pH below the isoelectric point, the amine groups gain a proton, resulting in a positive charge on the amino groups. Thus, as colloidal electrodes, one can depict an enzyme's electrical potential as a function of the sum of the charges on the free amino groups in the apoenzyme. The prosthetic group then can function as the site for this potential to electrochemically react, or discharge. A simplified version, neglecting the interconnecting bonds for the amino acids, but illustrating the potential build up, could be as follows (A⁻ or A⁺ denotes free amino groups, P denotes prosthetic groups):

Above isoelectric point:

(14) $[A^- - A^- - A^- - A^- -]_n P$

Below isoelectric point:

(15) $[A^+ - A^+ - A^+ - A^+ -]_n P$

It is rather probable electrochemically that this build up of potential on a chain can enhance the cathodic or anodic capabilities of the enzyme. Some very appreciable potentials might result from long chains of amino acids containing free amino groups. Indeed, it would seem highly unlikely that this potential would not produce an electrochemical effect.

In the mathematical formulas for enzyme kinetics, the omnipresent k, or K represents a constant for the characteristics of a specific enzyme in the velocity of a reaction. By equation:

$V$ equals velocity
$a$ equals concentration of reacting substances
$k$ equals constant for reaction
$t$ equals time
$(a - x)$ equals change in concentration in a given time $$V = \frac{dx}{dt} = k(a-x)$$

$$k = \frac{1}{t} \log_e \frac{(a)}{(a-x)}$$

It is suggested that $k$ is a function of the sum of the charges of the free amine groups, and the ability of the extended molecule to communicate that potential through resonance, or other effective molecular conductivity. Letting $r$ represent effective molecular conductivity, the value for $k$ can be conceptually represented according to:

$$k = [A^{+ \, or \, -}]_n \, r$$

Thus the function of an enzyme is similar to that of a colloidal electrode.

DISCUSSION OF RESULTS

Accordingly, it would appear that while amylases may not be the most desirable reaction to follow, that a significant electrochemcial affect was produced upon the enzyme reaction utilizing an external electron source as an assist to the enzyme's reactions.

In a photosensitive enzyme system, a collector may be employed utilizing an enzyme as a photo-reactant, with the anolyte conditions being satisfactory for the particular requirements of the enzyme, including the pH range, temperature range, and the like. In certain instances, co-enzymes may be required, such as an enzyme activator in order to enhance activation of the enzymes present.

The concept in which it is concluded that enzymes as in photosynthesis be considered as functioning as colloidal electrodes is hereby further supported.

In any of these arrangements, the cell may utilize incident radiation either on a direct, diffused, or concentrated basis. Also, the addition of certain electroconductive enhancing materials may be employed in order to increase the conductivity of the individual segments of the cells, thereby increasing the power capability under certain operating conditions.

I claim:

1. Photoelectrogenerative cell means comprising, in combination, cell means including an anode cell and a cathode cell for retaining an anolyte and catholyte respectively, cell isolation means physically separating and ionically coupling said anolyte and said catholyte; means providing for the transmission of solar radiation into said anolyte;
    a. said anode cell containing an anolyte comprising an electrolyte in aqueous solution and a particulate photosensitive electrogenerative solid substantially insoluble in said anolyte solution in admixture with said anolyte therein, an anode immersed in said anolyte, said anode being effectively electrolytically inert to said anolyte and to said photosensitive electrogenerative material;
    b. said cathode cell containing a catholyte consisting essentially of an electrolyte in aqueous solution and a cathode immersed in said catholyte, said cathode being effectively electrolytically inert to said catholyte; and
    c. said cell isolation means comprising electrolytically permeable means electrolytically coupling the respective solutions of said anolyte cell and said catholyte cell.

2. The photoelectrogenerative cell means as defined in claim 1 being particularly characterized in that said photosensitive electrogenerative solid material is included in said anolyte cell in a concentration sufficient to render said cell opaque to the transmission of solar radiation therethrough.

3. The photoelectrogenerative cell means as defined in claim 1 being particularly characterized in that said photosensitive electrogenerative solid material comprises a polyvalent element having the characteristic of being ionized into one of at least two stable oxidation states.

4. The photoelectrogenerative cell means as defined in claim 1 being particularly characterized in that said photosensitive electrogenerative material is an enzyme.

5. The photoelectrogenerative cell means as defined in claim 1 being particularly characterized in that a viscosity increasing substance is present in said anolyte.

6. The photoelectrogenerative cell means as defined in claim 1 being particularly characterized in that means are provided for circulation of said anolyte.

7. The photoelectrogenerative cell means as defined in claim 1 being particularly characterized in that means are provided for circulation of said catholyte.

8. The photoelectrogenerative cell means as defined in claim 1 being particularly characterized in that electrical biasing means are coupled to said electrodes.

9. Photoelectrogenerative cell means comprising, in combination, cell means including an anode cell and a cathode cell for retaining an anolyte and catholyte respectively, cell isolation means physically separating and ionically coupling said anolyte and said catholyte; means providing for the transmission of solar radiation into said anolyte;
    a. said anode cell containing an anolyte comprising an electrolyte in aqueous solution and a particulate solid state photosensitive electrogenerative material in admixture with said anolyte and being substantially insoluble therein, an anode immersed in said anolyte, said anode being effectively electrolytically inert to said anolyte and to said photosensitive electrogenerative material;
    b. said cathode cell containing a catholyte consisting essentially of an electrolyte in aqueous solution and a cathode immersed in said catholyte, said cathode being effectively electrolytically inert to said catholyte; and c. said cell isolation means comprising electrolytically permeable means electrolytically coupling the respective solutions of said anolyte cell and said catholyte cell.

10. Photoelectrogenerative cell means comprising, in combination, cell means including an anode cell and a cathode cell for retaining an anolyte and catholyte respectively, cell isolation means physically separating and electrolytically coupling said anolyte and said catholyte; means providing for the transmission of solar radiation into said anolyte;

a. said anode cell containing an anolyte comprising an electrolyte in aqueous solution and a particulate photovoltaic solid material in admixture with said anolyte and substantially insoluble therein, an anode immersed in said anolyte, said anode and being effectively electrolytically inert to said anolyte and to said photovoltaic material;

b. said cathode cell containing a catholyte consisting essentially of an electrolyte in aqueous solution and a cathode immersed in said catholyte, said cathode being effectively electrolytically inert to said catholyte; and c. said cell isolation means comprising electrolytically permeable means electrolytically coupling the respective solutions of said anolyte cell and said catholyte cell.

11. The photoelectrogenerative cell means as defined in claim 10 being particularly characterized in that said photovoltaic material is cadmium sulfide.

12. The photoelectrogenerative cell means as defined in claim 10 being particularly characterized in that a viscosity increasing substance is present in said anolyte.

* * * * *